United States Patent [19]

Yoshida et al.

[11] Patent Number: 5,103,302
[45] Date of Patent: Apr. 7, 1992

[54] OPTICAL SYSTEM FOR PROJECTION TYPE IMAGE DISPLAY DEVICE

[75] Inventors: Takahiko Yoshida, Ebina; Hiroki Yoshikawa, Hiratsuka; Shigeru Mori, Chigasaki; Koji Hirata, Kamakura; Tooru Numata; Isao Yoshizaki, both of Yokohama; Mitsuo Okimoto, Chigasaki, all of Japan

[73] Assignee: Hitachi, Ltd., Tokyo, Japan

[21] Appl. No.: 466,927

[22] Filed: Jan. 18, 1990

[30] Foreign Application Priority Data

Jan. 20, 1989 [JP] Japan .................... 1-9707
Feb. 17, 1989 [JP] Japan .................... 1-36142

[51] Int. Cl.⁵ .................................... H04N 9/31
[52] U.S. Cl. ............................. 358/60; 358/231
[58] Field of Search ............... 358/60, 64, 231, 237, 358/239; 313/474, 478

[56] References Cited

U.S. PATENT DOCUMENTS

| | | | |
|---|---|---|---|
| 4,679,069 | 7/1987 | Andrea et al. | 358/60 |
| 4,730,211 | 3/1988 | Hasegawa | 358/60 |
| 4,737,840 | 4/1988 | Morishita | 358/60 |
| 4,827,334 | 5/1989 | Johnson et al. | 358/231 |
| 4,914,510 | 4/1990 | Brennesholtz et al. | 313/478 |
| 4,914,511 | 4/1990 | Brennesholtz et al. | 358/60 |
| 4,931,859 | 6/1990 | Dillard et al. | 358/60 |

Primary Examiner—Stephen Brinich
Attorney, Agent, or Firm—Antonelli, Terry, Stout & Kraus

[57] ABSTRACT

A projection type image display device provided with three projecting lenses projecting light emitted by cathode-ray tubes of different colors, red, green and blue, on a screen while enlarging an image is disclosed, in which clapper plates are disposed preferably in front of the red and the blue image source and the clapper plates have different shapes so as to obtain an image without the fluctuation in the color on the whole surface of the screen, even in the case where the distance from the cathode-ray tubes to the screen is shortened in order to reduce the size of the display device.

28 Claims, 11 Drawing Sheets

4R

4G

4B

F I G. 12A  F I G. 12B
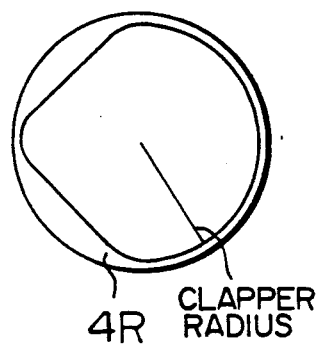
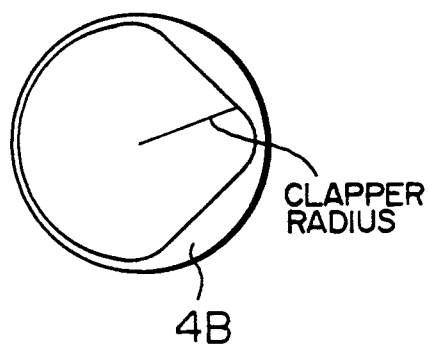
F I G. 13
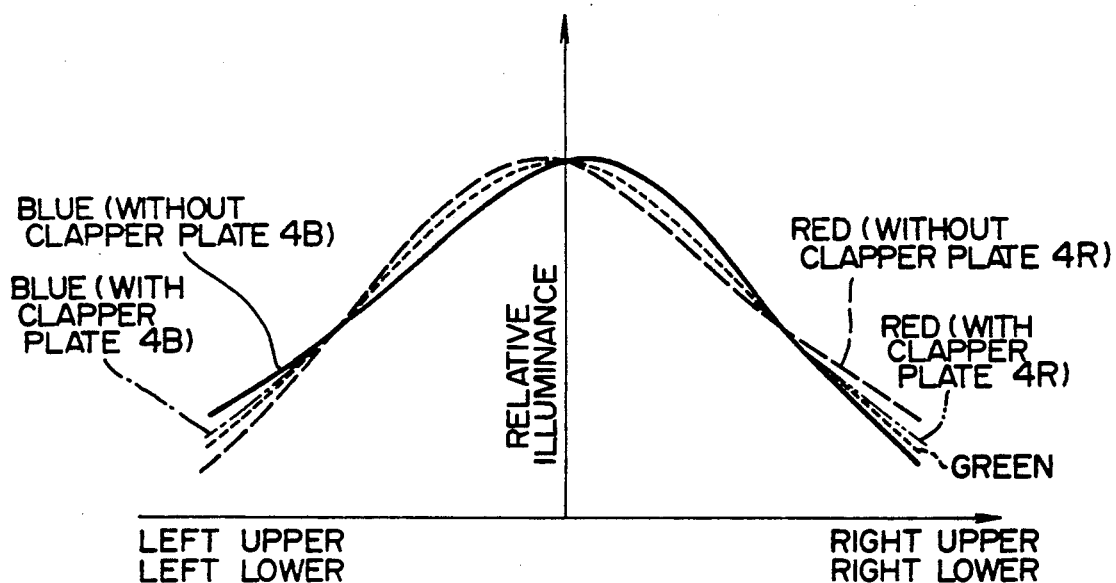

CLAPPER RADIUS

CLAPPER RADIUS

OPTICAL SYSTEM FOR PROJECTION TYPE IMAGE DISPLAY DEVICE

BACKGROUND OF THE INVENTION

The present invention relates to a projection type image display device, which enlarges an image displayed on an image source by means of a projecting lens to display it on a screen, and in particular to a projection type image display device, an optical system therefor and a projecting lens therefor, which are suitable for intending to reduce color fluctuations in the image on the screen.

The present invention is useful for reducing color fluctuations in the image, in the case where it is intended to shorten the distance from the image source to the screen to reduce the size of the display device.

Recently the projection type television, by which images displayed on a small image sources such as projection type cathode-ray tubes are enlarged by means of projecting lenses to be projected on a screen, is more and more widely utilized for home use and business use, because improvement in the image quality is remarkable and it is possible to enjoy images on a great screen with impressive presence, aided by the fact that semiconductor large capacity memories have been developed and that it has become easier to effect digital control of the dynamic convergence of the cathode-ray tube, etc.

In the projection type television, in the case where a projection type cathode-ray tube is used as an image source, it is usual heretofore that a cathode-ray tube and a projecting lens are combined for each of the three primitive colors, red, green and blue, and an image of three primitive colors is synthesized on a screen, as disclosed e.g. in JP-A-Sho 61-95689, in order to increase satisfactorily the brightness of the image on the screen.

According to the prior art technique described above, the cathode-ray tubes of the three primitive colors are juxtaposed in the direction from the left to the right of the screen. Usually the green cathode-ray tube is located at the center and the red cathode-ray tube and the blue one are located on the left and the right side thereof, respectively, so that the optical axes of the different colors are intersected with each other at one point in the neighborhood of the screen. The projection directions for the images of the different colors, red, green and blue, to the screen are different from each other and the tendencies of the distributions of the brightness on the screen are different for the different colors. Therefore, e.g. when a white image is projected on the whole surface of the screen, fluctuations in the color are produced, i.e. the image is locally reddish or bluish. These fluctuations in the color will be explained below quantitatively.

FIG. 1 is a scheme illustrating the prior art projecting optical system developed in the horizontal direction, in which 1R, 1G and 1B represent a red, a green and a blue projection type cathode-ray tube, respectively; 2R, 2G and 2B are projecting lenses for the projection type cathode-ray tubes 1R, 1G and 1B, respectively; 8 is a screen; 8C is the center of the screen; 8R is the right end of the screen; 8L is the left end of the screen; 9R, 9G and 9B are a red, a green and a blue light beam, respectively; and 3R, 3G and 3B are optical axes of the projecting lenses 2R, 2G and 2B, respectively.

FIG. 2 is a front view of the screen 8, on which a coordinate system is so defined that the origin is positioned at the screen center 8C; the positive direction of the x-axis is directed towards the right in the horizontal direction; and the positive direction of the y-axis is directed upward in the vertical direction. A point P(x, y) is an arbitrary point on the screen 8.

Further, in FIGS. 1 and 2, $W_H$ and $W_V$ represent the width and the height of the screen, respectively; D indicates the distance between the exit pupils (not shown in the figure) of the projecting lenses 2R, 2G and 2B and the screen center 8C; $\theta$ is an angle offset, with which the optical axes of the projecting lenses are converged; and 10R, 10G and 10B are optical axes of the light beams from the cathode-ray tubes 1R, 1G and 1B to the point P on the screen 8, respectively.

The illuminance at the point P(x, y) on the illuminated side of the screen 8 due to the light beams from the cathode-ray tubes 1R, 1G and 1B to the screen 8, when a white image is projected on the whole surface of the screen, will be calculated.

For the sake of simplicity it is supposed that the cathode-ray tubes 1R, 1G and 1B are perfect diffusing surface light sources, which are infinitely distant from the projecting lenses 2R, 2G and 2B, respectively. That is, it is supposed that all the light beams from the cathode-ray tubes 1R, 1G and 1B to the point P on the screen 8 enter the projecting lenses 2R, 2G and 2B as parallel light beams having a uniform brightness, respectively.

Further it is supposed that the light beams entering the projecting lenses 2R, 2G and 2B from the cathode-ray tubes 1R, 1G and 1B are emitted by the projecting lenses 2R, 2G and 2B through the center of the exit pupil thereof, respectively, without any loss.

Here the angles formed by the optical axes 10R, 10G and 10B from the cathode-ray tubes 1R, 1G and 1B to the point P on the screen 8 and the optical axes 3R, 3G and 3B are denoted by $\omega_{LR}$, $\omega_{LG}$ and $\omega_{LB}$ (hereinbelow called image angles of the point P), respectively; the angles formed by the optical axes 10R, 10G and 10B and the normal to the screen 8 by $\omega_{SR}$, $\omega_{SG}$ and $\omega_{SB}$ (hereinbelow called screen incident angles), respectively; the distances between the exit pupils of the projecting lenses 2R, 2G and 2B and the point P by $D_R$, $D_G$ and $D_B$, respectively; and the illuminances for red, green and blue at the point P by $E_R$, $E_G$ and $E_B$, respectively; the illuminances for red, green and blue at the center 8C of the screen by $E_{RO}$, $E_{GO}$ and $E_{BO}$.

Further, in the following calculation formulas, a suffix i indicates R, G and B, which represent the red, the green and the blue, respectively.

Under the suppositions described above the illuminance $E_i$ for the different colors at the point P is proportional to the area of the entrance pupil of the projecting lenses 2R, 2G and 2B, respectively. This area of the entrance pupil is proportional to $\cos\omega_{Li}$, when the image angle at the point P is $\omega_{Li}$. Further, in the case where each of the projecting lenses is composed of a plurality of lens elements, "vignetting" of the light is often produced due to the fact that the aperture of each of the lens elements is finite, and if the aperture efficiency at this time is supposed to be represented by a function of the image angle $\omega_{Li}$ at the point P, i.e. $V(\omega_{Li})$, the illuminance $E_i$ at the point P is proportional to $V(\omega_{Li})$ Still further, the illuminance $E_i$ at the point P is inversely proportional to the square of the distance $D_i$ between the exit pupil of the projecting lens 2R, 2G or 2B and the point P according to the inverse distance square law and proportional to $\cos\omega_{Si}$, $\omega_{Si}$ representing the screen incident angle, according to the law of cosinus of incident angle.

Consequently the illuminance $E_i$ at the point P can be expressed by;

$$E_i = \frac{E_{io}V(\omega_{Li}) \cdot \cos\omega_{Li} \cdot \cos\omega_{Si}}{(D_i/D)^2 (1 - S_i^2 + S_i^2\cos\theta)} \quad (1)$$

where i=R, G, B, $$S_i = \begin{cases} -1 & (\text{if } i = R) \\ 0 & (\text{if } i = G), \\ 1 & (\text{if } i = B) \end{cases} \quad (2)$$

and $$\begin{aligned} D_i^2 &= (x - S_iD\sin\theta)^2 + y^2 + D^2(1 - S_i^2\sin^2\theta) \\ &= x^2 - 2S_iD_x\sin\theta + y^2 + D^2 \end{aligned} \quad (3)$$

Further, according to the cosinus theorem, $\cos\omega_{Li}$ and $\cos\omega_{Si}$ can be given by $$\cos\omega_{Li} = \frac{D_i^2 + D^2 - x^2 - y^2}{2D_iD} \quad (4)$$

and $$\cos\omega_{Si} = \frac{D(1 - S_i^2 + S_i^2\cos\theta)}{D_i} \quad (5)$$

respectively.

At this time, if i = G, i.e. for the green projected light, since $$\cos\omega_{Li} = \cos\omega_{Si} = D/D_i$$

using Eqs. (3), (4) and (5), Eq. (1) can be transformed into:

$$E_G = E_{GO}V(\omega_{LG})\cos^4\omega_{LG}.$$

Thus it can be understood that the illuminance at the point P on the screen 8 is proportional to the fourth power of casinus of the image angle $\omega_{LG}$. This is no more than a formula according to the so-called cosinus fourth power law.

A concrete example of the illuminance at the point P, where the illuminance at the screen center 8C, $E_{i0}=1$, will be indicated below (hereinbelow called relative illuminance).

FIG. 3 shows the distribution of the illuminance in the horizontal direction passing through the center on the incident surface of the screen 8, in which the abscissa represents the position in the horizontal direction and the ordinate the relative illuminance, when all the illuminances for red, green and blue at the screen center 8C are equal to 1, the broken line indicating the distribution of the illuminance for red; the dotted line that for green; the full line that for blue. For this calculation it is supposed that the size of the screen 8 is 40" measured along the diagonal; WH=812 mm; $W_V$=610 mm; D=900 mm; and $\theta=8°$. Further the aperture efficiency $V(\omega_{Li})$ of the projecting lens is approximated by;

$$V(\omega_{Li}) \approx \cos^8\omega_{Li}.$$

From FIG. 3 it can be understood that, contrarily to the fact that the distribution of the illuminance for green is symmetric with respect to the center of the screen, the distribution of the illuminance for red is deviated towards the left on the screen and that for blue is deviated towards the right on the screen. This deviation increases with the increasing optical axis convergence angle offset $\theta$.

As the result, with reference to the white color in the neighborhood of the center of the screen, from the left upper corner to the left lower corner of the screen, since the relative illuminance for red is higher and that for blue is lower than that for green, the color temperature is low and it seems to be reddish or yellowish. On the contrary, from the right upper corner to the right lower corner of the screen, since the relative illuminance for red is lower and that for blue is higher than that for green, the color temperature is high and it seems to be bluish or cyanish. For this reason the observer recognizes the presence of fluctuations in color.

On the other hand, on the manner how the fluctuations in color are seen, there is known in the visual sensation psychology a perception phenomenon called "color contrast effect". This is a phenomenon that, when a region of a certain color (test field) is enclosed by a region of another color (inducing field), the color in the test field is seen, as if it were changed in another color, in which the complement of the color in the inducing field is added to the color itself in the test field.

As described above, in the prior art projection type optical system, when a white image is projected on the whole surface of the screen, a region, which is more reddish or yellowish, and a region, which is more bluish or cyanish than the neighborhood of the center of the screen, are produced. Since these regions are in a relation that the colors therein are complementary to each other, the fluctuations in the color are seen, emphasized by the color contrast phenomenon. These fluctuations in the color is in a level, which is so high that the observer can recognize them, not only when a white image is projected on the whole surface of the screen but also when a general image of the television broadcast is projected. Therefore there was a problem that the quality of the image was impaired significantly.

In particular, in a projection type image display device, for which it is required to reduce the size of the space for mounting the device as far as possible, such as a rear projection type television for home use, it is necessary to shorten the projection distance from the projecting lens to the screen in the projecting optical system, in order to reduce the size of the casing for the device. In this case, since the optical axis (convergence) angle offset formed by the optical axes of the projecting lenses for the different colors increases, the fluctuations in the color are increased further. For this reason there was a problem that it was prevented to reduce the size.

The object of the present invention is to provide a compact projection type image display device, an optical system therefor as well as a projecting lens used therein capable of solving the problems of the prior art technique described above and obtaining images of high quality, while realizing the compatibility of shortening the projection distance from the projecting lens to the screen in the projecting optical system and reducing the fluctuation in the color on the screen.

SUMMARY OF THE INVENTION

In order to achieve the above object, a projection type image display device is so constructed that there is disposed a clapper plate having a clapper shape, which is not axially symmetric with respect to the optical axis of the relevant projecting lens, in the optical path of the projected light emitted by at least one image source for a color among the image sources for the different colors, red, green and blue, passing through the projecting lens therefor, and projected to the screen.

Or it is so constructed that there are disposed clapper plates having clapper shapes, each of which is, not axially symmetric with respect to the optical axis of the relevant projecting lens, and which are different for the different colors with reference to the up and down direction and the left and right direction on the image face of the image source, in the optical paths of the projected light beams for the different colors.

Or it is so constructed that the image sources for the different colors, red, green and blue, are located in a direction approximately parallel to the horizontal direction on the surface of the screen, the image source for green being at the center and that there are disposed clapper plates, each of which is not axially symmetric with respect to the optical axis of the relevant projecting lens, and which are symmetric to each other with reference to the up and down direction and the left and right direction on the image face of the image source, in the optical paths of the red and the blue projected light beam.

Or it is so constructed that one or more among image signal modulating means, means for modulating input electric power for the image source and means for modulating light emission output characteristics with respect to the input electric power for the image source are disposed instead of each of the clapper plates.

In a projection type image display device constructed as described above, when a white image is projected on the whole surface of the screen, it is possible to determine the clapper shape for each of the colors, in which the clapper radius measured from the optical axis of the projecting lens is relatively small in a specified direction so that the ratio of the illuminances of the different colors, red, green and blue, on the surface of the screen, which the projected light enters, in the neighborhood of the left and right ends of the screen or in the neighborhood of the four left and right and upper and lower corners, is approximately identical to the ratio of the illuminances of the different colors in the neighborhood of the center of the screen.

Furthermore, together therewith, when a white image is projected on the whole surface of the screen, it is possible to determine the clapper shape for each of the colors, in which the clapper radius measured from the optical axis of the projecting lens is relatively small in a specified direction so that the color temperature at the peripheral region, excluding the neighborhood of the center of the screen, is higher than the color temperature in the neighborhood of the center of the screen.

By using the clapper plates having the clapper shapes described above the fluctuations in the color on the surface of the screen can be reduced to a level, where the observer can hardly recognize them, and thus it is possible to obtain an image of very high quality.

On the other hand, in a color television set using a shadow mask type prior art color cathode-ray tube, when a white image is projected on the whole surface of the screen, the color temperature at the peripheral region, excluding the neighborhood of the center of the screen, is higher than the color temperature in the neighborhood of the center of the screen.

Consequently, in a projection type image display device, by determining the clapper shapes of the clapper plates described above so that the color temperature at the peripheral region is higher than the color temperature in the neighborhood of the center of the screen when a white image is projected on the whole surface of the screen, since it is possible to reproduce the colors in the same manner as the color television set using the color cathode-ray tube, usual observers accustomed to see the color television, using the color cathode-ray tube, feel the image having a high quality, having extremely small fluctuations in the color.

It is possible also to try to reduce the fluctuations in the color by disposing one or more among image signal modulating means, means for modulating input electric power for the image source and means for modulating light emission output characteristics for the input electric power to the image source instead of each of the clapper plates.

BRIEF DESCRIPTION OF THE DRAWINGS

FIGS. 12A and 12B are plan views of clapper plates used in the optical system indicated in FIG. 11;

FIG. 13 is a graph indicating the distribution of the illuminance on the projection surface in the diagonal direction on the surface of the screen used in the second embodiment;

FIGS. 14A, 14B to 18A, 18B, 18C are plan views illustrating other embodiments of the clapper plate.

DESCRIPTION OF THE PREFERRED EMBODIMENTS

Hereinbelow an embodiment of the present invention will be explained, referring to FIGS. 4 to 10A, 10B and 10C.

Figure 4:
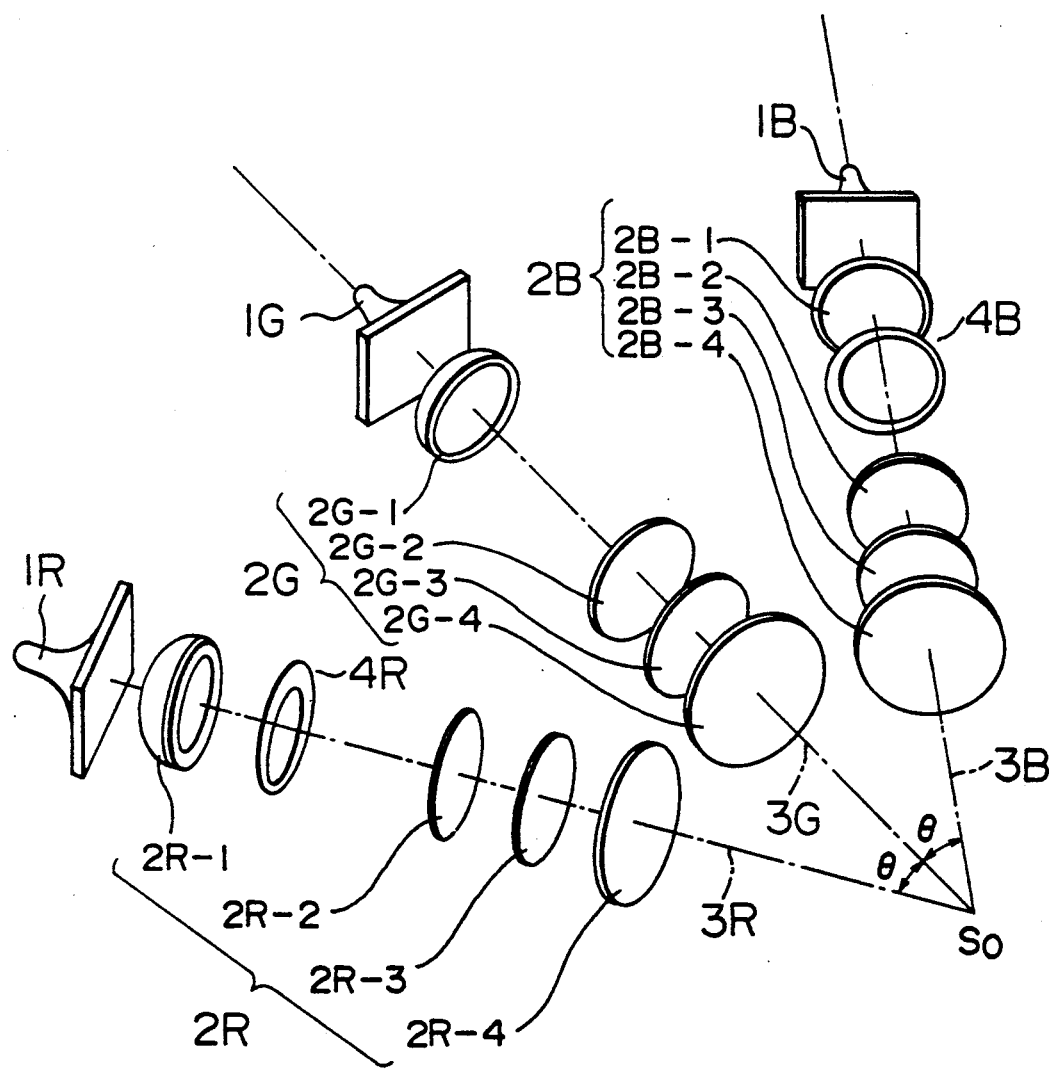
FIG. 4 is an exploded perspective view of an optical system, which is a first embodiment of the present invention.

FIG. 4 is an exploded perspective view of an optical system for a projection type image display device according to the present invention, in which 1R, 1G and 1B are projection type cathode-ray tubes for red, green and blue, respectively; 2R, 2G and 2B are projecting lenses for the projection type cathode-ray tubes 1R, 1G and 1B, respectively; 2R-1 to 2R-4, 2G-1 to 2G-4 and 2B-1 to 2B-4 are a first, a second, a third and a fourth lens constituting the projecting lenses 2R, 2G and 2B, respectively, among which the third lenses 2R-3, 2G-3 and 2B-3 contribute to the enlargement of the image as power lenses, the other lenses contributing principally to the correction of aberrations; and 3R, 3G and 3B are optical axes of the projecting lenses 2R, 2G and 2B, respectively, which intersect each other at a point $S_0$ with an optical axis (convergence) angle offset $\theta$. The screen (not shown in the figure) is so located that the normal thereto passing through the center thereof is approximately in accordance with the optical axis 3G and that the point $S_0$ is at the center thereof. 4R and 4B are clapper plates disposed for the projecting lenses 2R and 2B, having clapper shapes, which are not axially symmetric with respect to the optical axes 3R and 3B, respectively.

Figure 5:
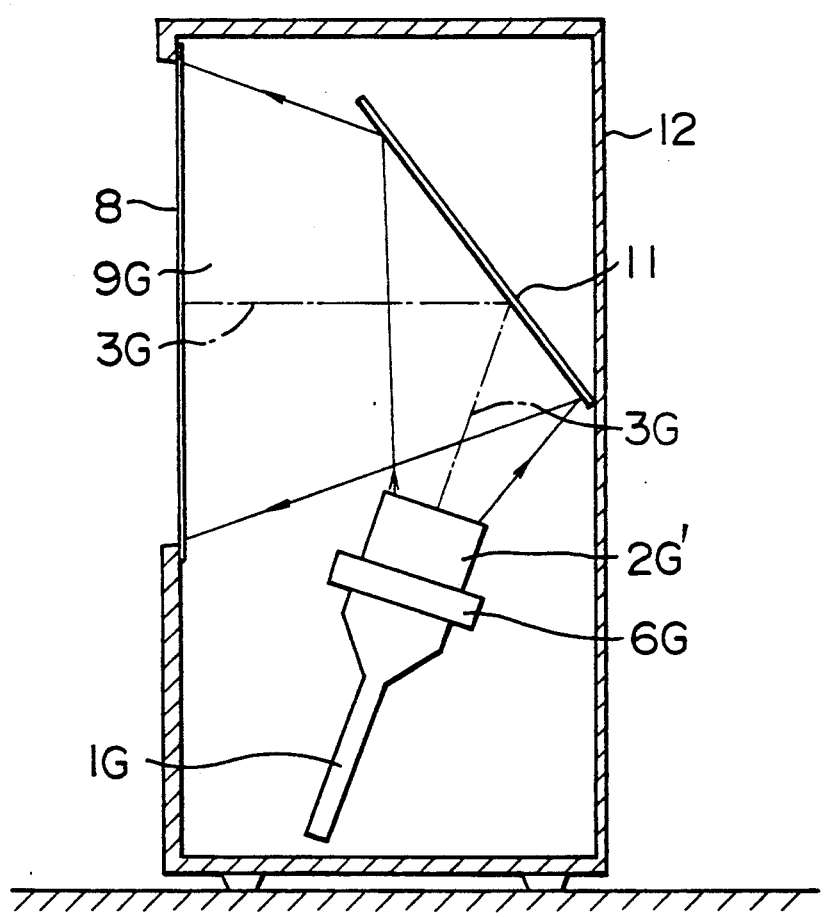
FIG. 5 is a cross-sectional view of the principal part of a rear projection type image display device using the optical system indicated in FIG. 4.

FIG. 5 is a cross-sectional view of the principal part of a rear projection type image display device using the optical system for the projection type image display device indicated in FIG. 4, including the optical axis 3G, in which reference numeral 8 is the screen; 9G is the green projected light beam; 11 is a reflecting minor for reflecting the projected light beam 9G; 12 is a casing; and 2G' is a body tube, in which the projecting lens 2G is mounted, and which is coupled with the projection type cathode-ray tube 1G through a coupler 6G.

When a rear projection type image display device as indicated in FIG. 5 is set in a usual house, it is required to make the setting space for the device as short as possible. For this reason it is necessary to reduce the depth of the device. For this purpose the projecting lenses 2R, 2G and 2B in the optical system indicated in FIG. 4 is so designed that the projection distance therefrom to the point $S_0$ on the screen is as short as possible. At this time the optical axis (convergence) angle offset $\theta$ is not necessarily small because of the diameter of the projecting lenses 2R, 2G and 2B or the size of the projection type cathode-ray tubes 1R, 1G and 1B.

Figure 6:
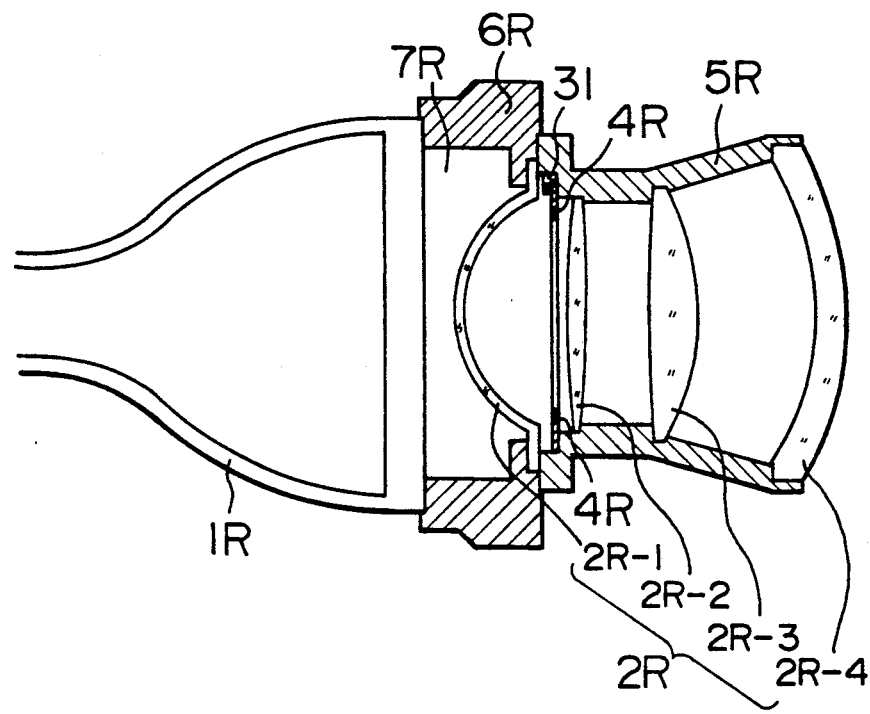
FIG. 6 is a cross-sectional view illustrating the mounting state of a projection type cathode-ray tube and a projecting lens.

FIG. 6 is a cross-sectional view illustrating the mounting state of the projection type cathode-ray tube for red 1R and the projecting lens 2R therefor, in which 5R is a lens body tube; 6R is a coupler coupling the projection type cathode-ray tube 1R with the projecting lens 2R; 7R is transparent liquid cooling medium, which is sealed within a space enclosed by the projection type cathode-ray tube 1R, the first lens 2R-1 and the coupler 6R and which aids by convection the emission of heat generated by the projection type cathode-ray tube 1R; and 31 is a nail for preventing the rotation of the clapper plate 4R.

In FIG. 6, since the third lens 2R-3 is the power lens, the entrance pupil is roughly between the second lens 2R-2 and the third lens 2R-3 and the exit pupil is roughly between the third lens 2R-3 and the fourth lens 2R-4. Consequently the clapper plate 4R is located between the projection type cathode-ray tube 1R and the entrance pupil of the projecting lens 2R.

At this time, in FIG. 4, the image projected on the screen is reversed with respect to the image displayed on the projection type cathode-ray tube 1R. For example, a light beam emitted by a pixel in the neighborhood of the right end of the projection type cathode-ray tube 1R seen from the screen passes aside to the right side through the hole formed in the clapper plate 4R and further through the neighborhood of the center of the power lens 2R-3 and is converged in the neighborhood of the left end of the screen. On the other hand a light beam emitted by a pixel in the neighborhood of the left upper corner of the projection type cathode-ray tube 1R passes aside to the left upper side through the hole formed in the clapper plate 4R and further through the neighborhood of the center of the power lens 2R-3 and is converged in the neighborhood of the right lower corner of the screen. Consequently, if the clapper radius of the clapper plate 4R measured from the optical axis 3R is varied, depending on the direction, the "shaded" of the light beam from the projection type cathode-ray tube 1R to the screen due to the clapper plate 4R varies, depending on the projection direction, and thus it is possible to change the distribution of the illuminance on the incident surface of the screen in the neighborhood of the left and right ends, or in the neighborhood of each of the left and right upper and lower corners.

The projection type cathode-ray tubes 1G and 1B for green and blue and the projecting lenses 2G and 2B are mounted also in the manner similar to that indicated in FIG. 6. However, in the present embodiment, no clapper plate is disposed for the projecting lens for green.

Figures 7A, 7B:
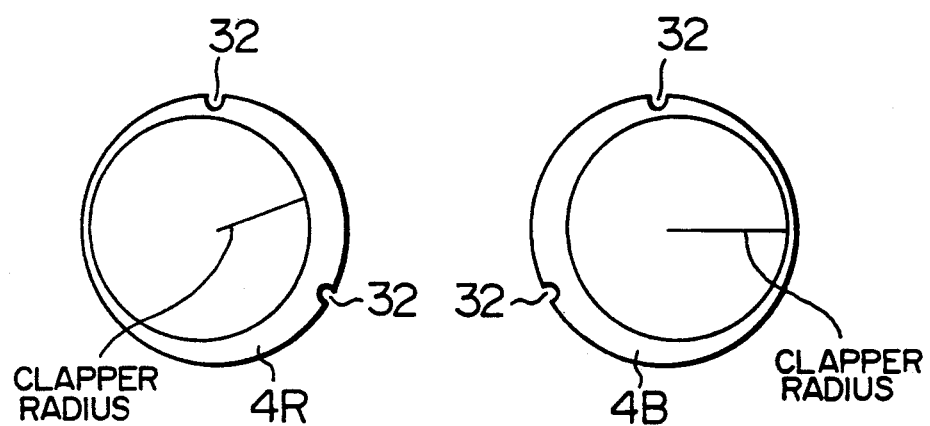
FIGS. 7A and 7B are plan views of clapper plates used in the optical system indicated in FIG. 4.

FIGS. 7A and 7B are plan views of the clapper plates 4R and 4B described above seen through from the screen side, in which reference numeral 32 indicates a cut-out portion, with which the nail 31 for preventing the rotation mounted on the inner surface of the lens body tube 5R is engaged.

In the clapper plate 4R indicated in FIG. 7A the clapper radius is smaller on the right side seen from the screen side so that the red illuminance in the neighborhood of the left end of the screen can be suppressed. On the other hand, in the clapper plate 4B indicated in FIG. 7B the clapper radius is smaller on the left side seen from the screen side so that the blue illuminance in the neighborhood of the right end of the screen can be suppressed.

Variations in the distribution of the illuminance on the incident surface of the screen due to the presence or absence of the clapper plate 4R or 4B in the optical system for the projection type image display device indicated in FIG. 4 will be further explained.

Figure 8:
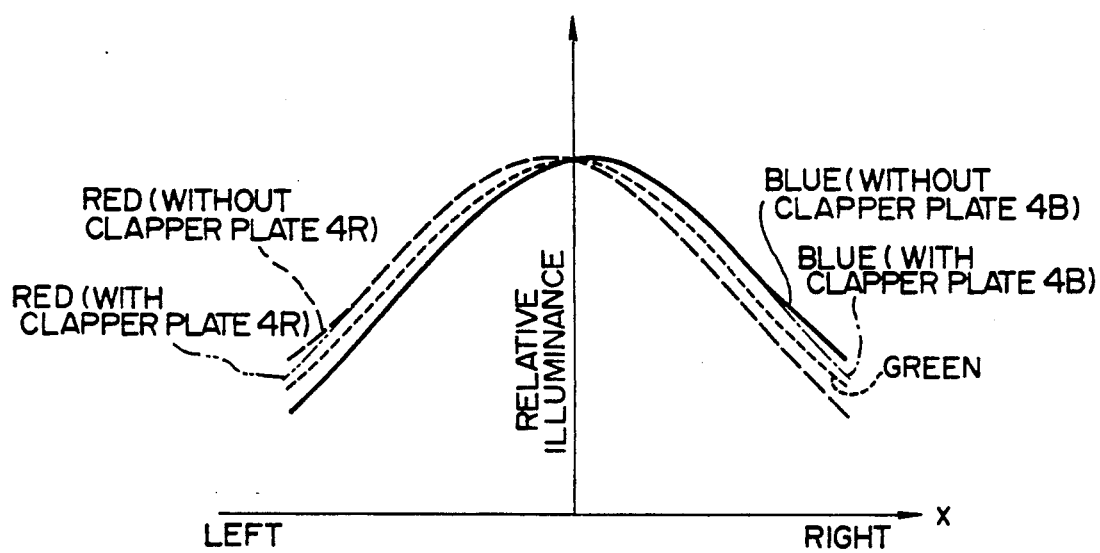
FIG. 8 is a graph indicating the distribution of the illuminance on the projection surface in the horizontal direction on the surface of the screen in the first embodiment.

FIG. 8 indicates the distribution of the illuminance on the incident surface in the horizontal direction passing through the center of the screen, in which the abscissa represents the position in the horizontal direction and the ordinate the relative illuminance, when all the illuminances for red, green and blue at the center of the screen are equal to 1, the broken line indicating the illuminance for red, the dotted line the illuminance for green, the full line the illuminance for blue.

Figure 1:
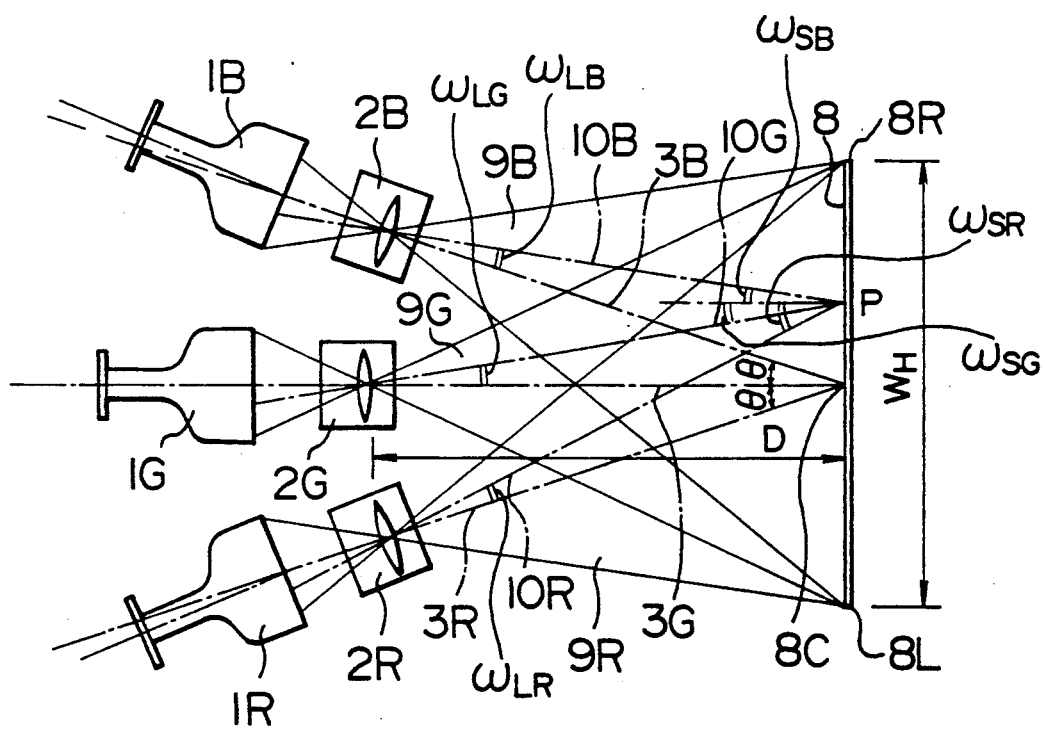
FIG. 1 is a scheme developed in the horizontal direction illustrating the outline of a prior art projection type optical system.
Figure 2:
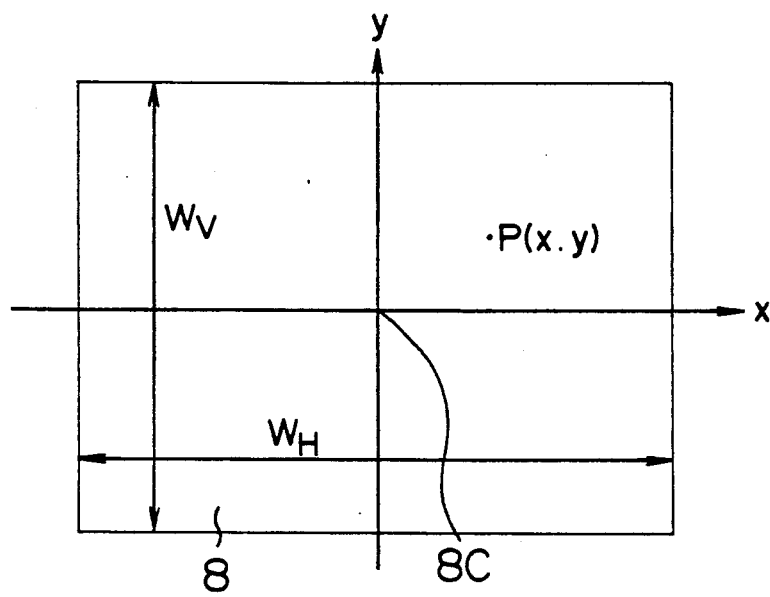
FIG. 2 is a plan view of the surface of the screen.
Figure 3:
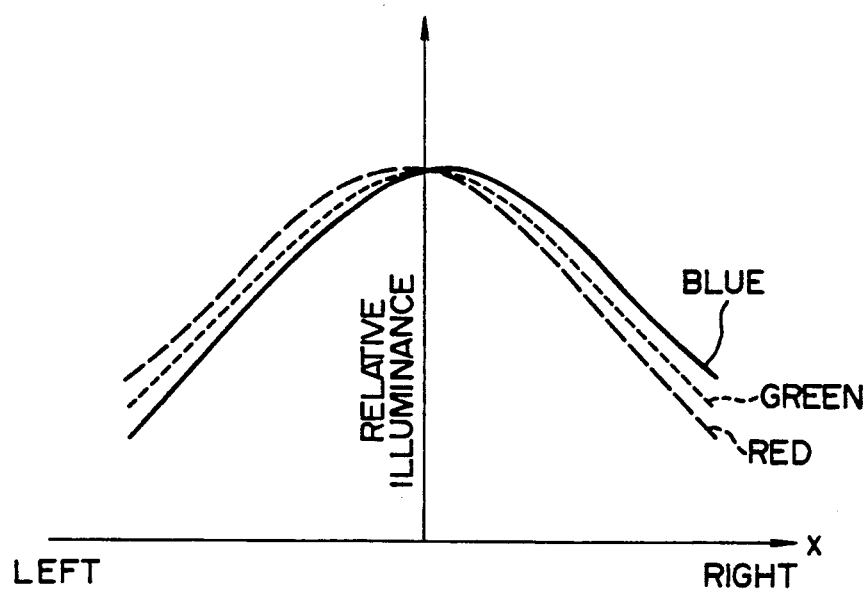
FIG. 3 is a graph indicating the distribution of the illuminance on the projection surface in the horizontal direction on the surface of the screen in the optical system indicated in FIG. 1.

In the case where neither the clapper plate 4R nor 4B is used in FIG. 4, just as the distribution of the illuminance explained in the prior art example indicated in FIG. 3, as indicated in FIG. 8, the illuminance for red is increased and that for blue is decreased in the neighborhood of the left end of the screen. On the contrary, in the neighborhood of the right end of the screen the illuminance for red is decreased and that for blue is increased.

Contrarily thereto, when the clapper plates 4R and 4B indicated in FIGS. 7A and 7B are located at the position indicated in FIG. 6, as described above, the illuminance for red in the neighborhood of the left end of the screen and the illuminance for blue in the neighborhood of the right end of the screen are suppressed. Consequently, in FIG. 8, the illuminance for red in the neighborhood of the left end of the screen is lowered as indicated by the two-dot-dashed line, which decreases the differences from the illuminances for green and blue. Further, the illuminance for blue in the neighborhood of the right end of the screen is lowered as indicated by the one-dot-dashed line, which decreases the differences from the illuminances for red and green. As the result, even in the case where the projection distance between the projecting lens and the screen is as small as e.g. about 700 to 800 mm and the angle offset of the optical axes of the different projecting lenses is as great as about 7° to 10°, the fluctuations in the color on the surface of the screen are reduced and thus an effect can be obtained that an image of very high quality is obtained.

Although the clapper plates 4R and 4B have the shapes indicated in FIGS. 7A and 7B, respectively, in the present embodiment, the clapper shapes are not restricted thereto.

Figure 9A:
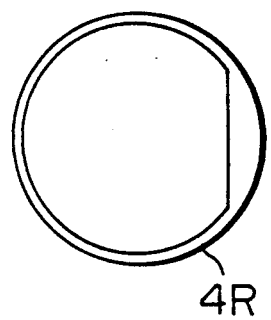
FIGS. 9A, 9B, 10A, 10B and 10C are plan views illustrating other examples of the clapper plate.
Figure 9B:
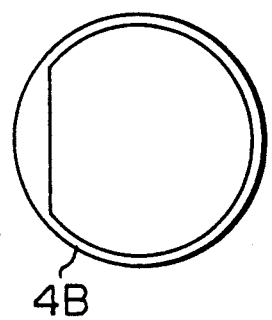

FIGS. 9A and 9B are plan views illustrating examples of other shapes of the clapper plates 4R and 4B. Comparing FIGS. 7A and 7B therewith, in the clapper plate 4R the clapper radius is greater in the right upper and the right lower direction and in the clapper plate 4B it is greater in the left upper and the left lower direction. In the case where these clapper plates are used, although the illuminance for red is somewhat greater on the left upper and the left lower side on the surface of the screen, the illuminance for blue is somewhat greater on the right upper and the right lower side and the quality is somewhat worse from the point of view of the fluctuations in the color than those obtained in the case where the clapper plates indicated in FIGS. 7A and 7B, an effect can be obtained that the brightness in the neighborhood of the four corners on the surface of the screen is not too low.

Figure 10A:
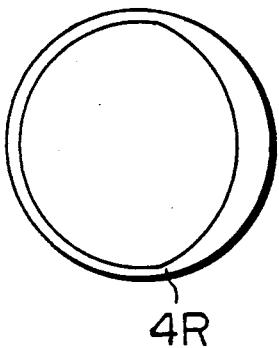
Figure 10B:
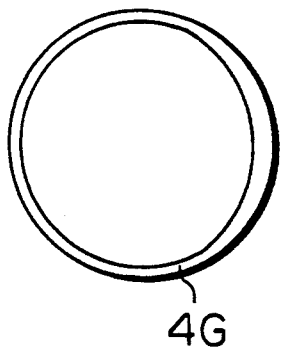
Figure 10C:
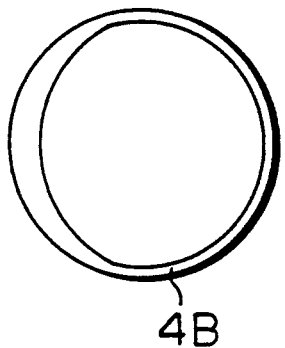

FIGS. 10A, 10B and 10C are plan views illustrating an example of the shapes of the clapper plates 4R, 4G and 4B, respectively, in the case where a clapper plate 4G is disposed also for the projecting lens for green. In the projection type cathode-ray tube 1B for blue, in the case where the amount of emitted light is not proportional to the energy of the electron beam entering the phosphor surface, but it is saturated, i.e. in the case where the so-called brightness saturation is remarkable, the illuminance for blue in the neighborhood of the left end of the screen is lowered further with respect to that indicated in FIG. 8. This is due to the fact that in the optical system for the projection type image display device indicated in FIG. 4 the projection magnification is greater at the left end of the screen, because the distance from the projecting lens 2B thereto is greater than that to the center of the screen, and that in order to display images having a same magnitude at the left end and at the center of the surface of the screen, a smaller image should be displayed at the right end of the projection type cathode-ray tube 1B than at the center. In this case, by using the clapper plates 4R, 4G and 4B indicated in FIGS. 10A, 10B and 10C, respectively, the illuminances for red and green in the neighborhood of the left end of the screen are somewhat decreased and the illuminance for blue in the neighborhood of the right end of the screen is somewhat decreased. Since differences in the illuminance between the different colors are reduced in this way, an effect can be obtained that the fluctuations in the color on the surface of the screen are reduced and thus an image of high quality is obtained.

Now other embodiments of the clapper plate according to the present invention will be explained, referring to FIGS. 11 to 18A, 18B and 18C.

Figure 11:
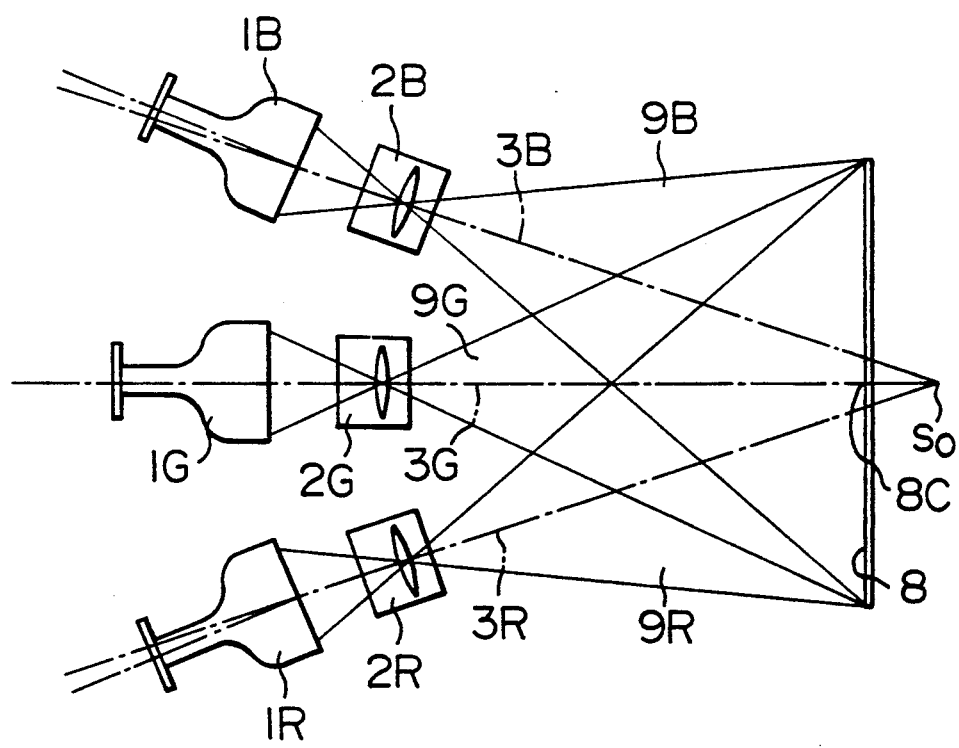
FIG. 11 is a scheme developed in the horizontal direction illustrating the outline of an optical system, which is a second embodiment of the present invention.
Figure 14A:
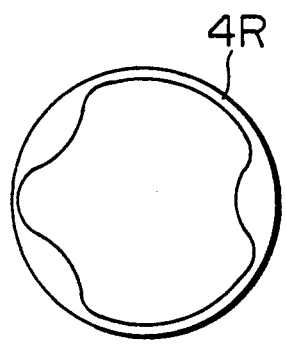
Figure 14B:
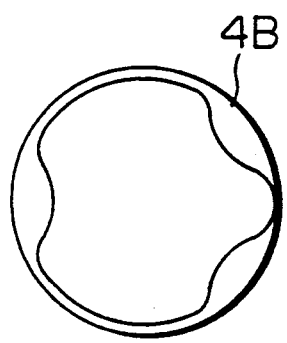
Figure 15A:
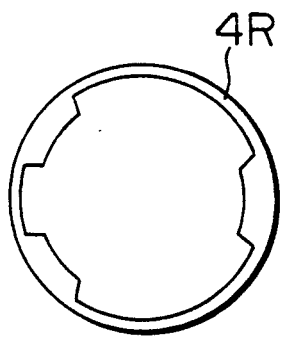
Figure 15B:
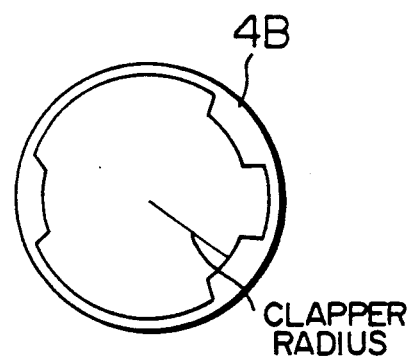
Figure 16A:
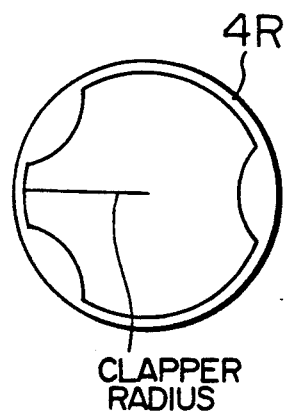
Figure 16B:
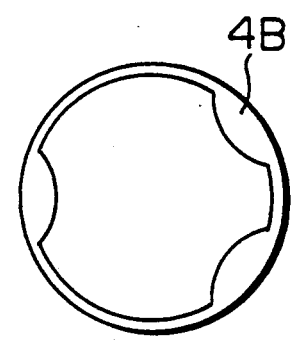

FIG. 11 is a scheme of another embodiment of the optical system for the projection type image display device according to the present invention developed in the horizontal direction, in which the items identical to those indicated in FIGS. 4 to 6 are indicated by the same reference numerals and explanation thereof will be omitted.

A difference of the optical system indicated in FIG. 11 from that indicated in FIG. 4 consists in that in FIG. 11 the screen is disposed aside to the projecting lenses with respect to the intersection $S_0$ of the optical axes 3R, 3G and 3B, contrarily to the fact that in FIG. 4 the screen is so located that the intersection $S_0$ is positioned at the center of the screen.

Also in the optical system indicated in FIG. 11, the clapper plates 4R and 4B are disposed within the projecting lenses 2R and 2B, respectively, as indicated in FIG. 6.

In the case where neither the clapper plate 4R nor 4B is disposed in the optical system indicated in FIG. 11, compared with the case where neither the clapper plate 4R nor 4B is disposed in the optical system indicated in FIG. 4, the difference in the illuminance between the different colors in the neighborhood of the screen center 8C is somewhat greater, but the difference in the illuminance between the different colors in the neighborhood of the left and right ends is smaller. Therefore the fluctuations in the color are reduced in the whole in the horizontal direction passing through the center of the screen. However, since the difference in the illuminance between the different colors is greater at the four corners of the screen, the clapper plates 4R and 4B are disposed within the projecting lenses 2R and 2B.

FIGS. 12A and 12B are plan views of the clapper plates 4R and 4B, respectively, used in the present embodiment, seen through from the screen side.

In the clapper plate 4R indicated in FIG. 12A, the clapper radius is smaller in the left upper and the left lower direction seen from the screen side and in this way the illuminance for red in the neighborhood of the right upper and the right lower corner of the screen can be suppressed. Further, in the clapper plate 4B indicated in FIG. 12B, the clapper radius is smaller in the right upper and the right lower direction seen from the screen side and in this way the illuminance for blue in the neighborhood of the left upper and the left lower corner of the screen can be suppressed.

FIG. 13 indicates the distribution of the illuminance on the incident surface in the diagonal direction of the screen, in which the abscissa represents the position in the diagonal direction and the ordinate the relative illuminance, when all the illuminances for red, green and blue at the center of the screen are equal to 1, the broken line indicating the illuminance for red, the dotted line the illuminance for green, the full line the illuminance for blue.

In the case where neither the clapper plate 4R nor 4B is used in the projecting lens 2R or 2B in the optical system indicated in FIG. 11, when the image is examined from the center of the screen to the left upper or lower corner, the illuminance for red is high and the illuminance for blue is lower in the neighborhood of the center and on the contrary the illuminance for blue is high and the illuminance for red is low in the neighborhood of the left upper and the left lower corner. In the right upper or lower direction from the center of the screen this tendence is reversed.

On the contrary, when the clapper plates 4R and 4B indicated in FIGS. 12A and 12B are disposed at the positions indicated in FIG. 6, the illuminance for blue in the neighborhood of the left upper and the left lower corner of the screen is suppressed and the illuminance for red in the neighborhood of the right upper and the right lower corner of the screen is suppressed, as described previously. Consequently, in FIG. 13, the illuminance for blue in the neighborhood of the left upper and the left lower corner of the screen is decreased as indicated by the one-dot-dashed line and the difference from the illuminances for red and green is reduced. Further the illuminance for red in the neighborhood of the right upper and the right lower corner of the screen is decreased as indicated by the two-dot-dashed line and the difference from the illuminances for green and blue is reduced. As the result, just as in the case of the first embodiment, the fluctuations in the color on the surface of the screen are reduced and thus an effect can be obtained that an image of high quality is realized.

In the optical system of the present invention indicated in FIG. 11, depending on the relative positional relation between the intersection $S_0$ of the optical axes 3R, 3G and 3B and the screen center 8C, in the case where there are no clapper plates 4R and 4B, the illuminance for red can be high in a same degree at the left end of the screen and the right upper and lower corners of the screen and the illuminance for blue can be high in a same degree at the right end of the screen and the left upper and lower corners of the screen.

FIGS. 14A and 14B, 15A and 15B as well as 16A and 16B are plan views illustrating other shapes of the clapper plates 4R and 4B, respectively, which are useful in the case described above. By using these clapper plates, the fluctuations in the color on the surface of the screen and an effect can be obtained that an image of high quality is realized.

Figure 17A:
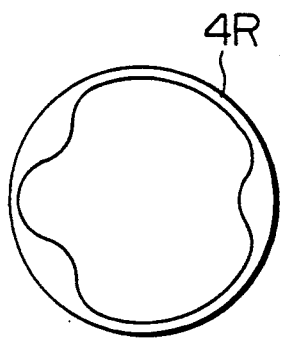
Figure 17B:
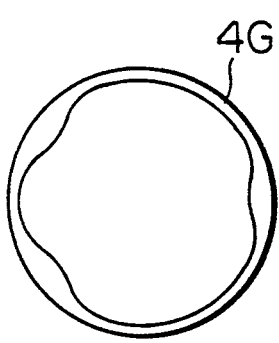
Figure 17C:
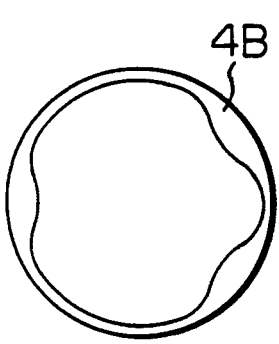
Figure 18A:
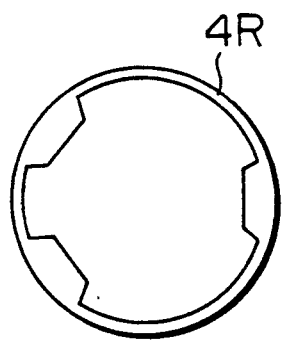
Figure 18B:
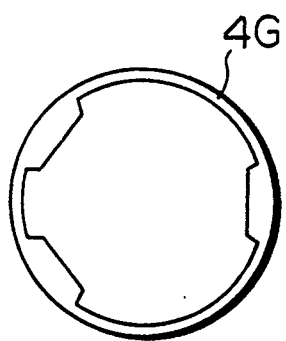
Figure 18C:
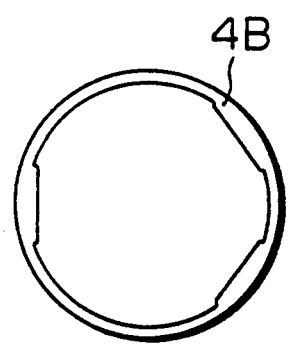

FIGS. 17A, 17B and 17C as well as 18A, 18B and 18C illustrate various shapes of the clapper plates 4R, 4G and 4B, respectively, which are suitable for keeping the color temperature higher at the peripheral portion of the screen than at the neighborhood of the center of the screen, when a white image is displayed on the whole surface of the screen. In this case, also for green the clapper plate 4G is used. Further different clapper shapes are adopted for the different colors so that the illuminance for blue is higher than the illuminances for red and green, in order to raise the color temperature at the peripheral portion of the screen. In this way, since the fluctuations in the color on the surface of the screen are extremely small and it is possible to reproduce the colors similar to the color television by means of a color cathode-ray tube, an effect can be obtained that usual observers feel the image having an extremely high quality.

When a white image is displayed on the whole surface of the screen, in the case where the color temperature is made higher at the peripheral portion of the screen than at the neighborhood of the center of the screen, it is desirable that the color temperature is high all over the peripheral portion of the screen. However, if unavoidable for designing the projecting optical system, a reasonable effect can be obtained, if the color temperature is high in a region greater than a half of the peripheral portion of the screen.

Although the clapper plates 4R, 4G and 4B are inserted between the projection type cathode-ray tubes 1R, 1G and 1B and the entrance pupils of the projecting lenses 2R, 2G and 2B, respectively, in each of the embodiments described above, it may be so constructed that these clapper plates are inserted between the exit pupils of the projecting lenses 2R, 2G and 2B and the screen. However, in this case, since the image projected on the screen is reversed with respect to the image displayed by the projection type cathode-ray tube, as described previously, it is necessary to dispose the clapper plates, rotated by 180° around the optical axes 3R, 3G and 3B, respectively. Further, in this case, since the "shaded" of the light beam by the clapper shape influences not only on the peripheral portion of the screen but also on pixels fairly close to the center, the brightness all over the picture on the screen is sacrificed more or less thereto. However, concerning the reduction of the fluctuations in the color, an effect similar to that described in the above embodiments can be obtained. Further all the clapper plates indicated in FIGS. 12A, 12B and 14A to 18C are useful in devices, in which the distance between the cathode-ray tube and the screen is shortened in order to reduce the size of the display device.

On the other hand, when a white image is displayed on the whole surface of the screen, in order to make the color temperature higher at the peripheral portion of the screen than in the neighborhood of the center of the screen, means using an electric circuit instead of each of the clapper plates can be used.

Figure 19:
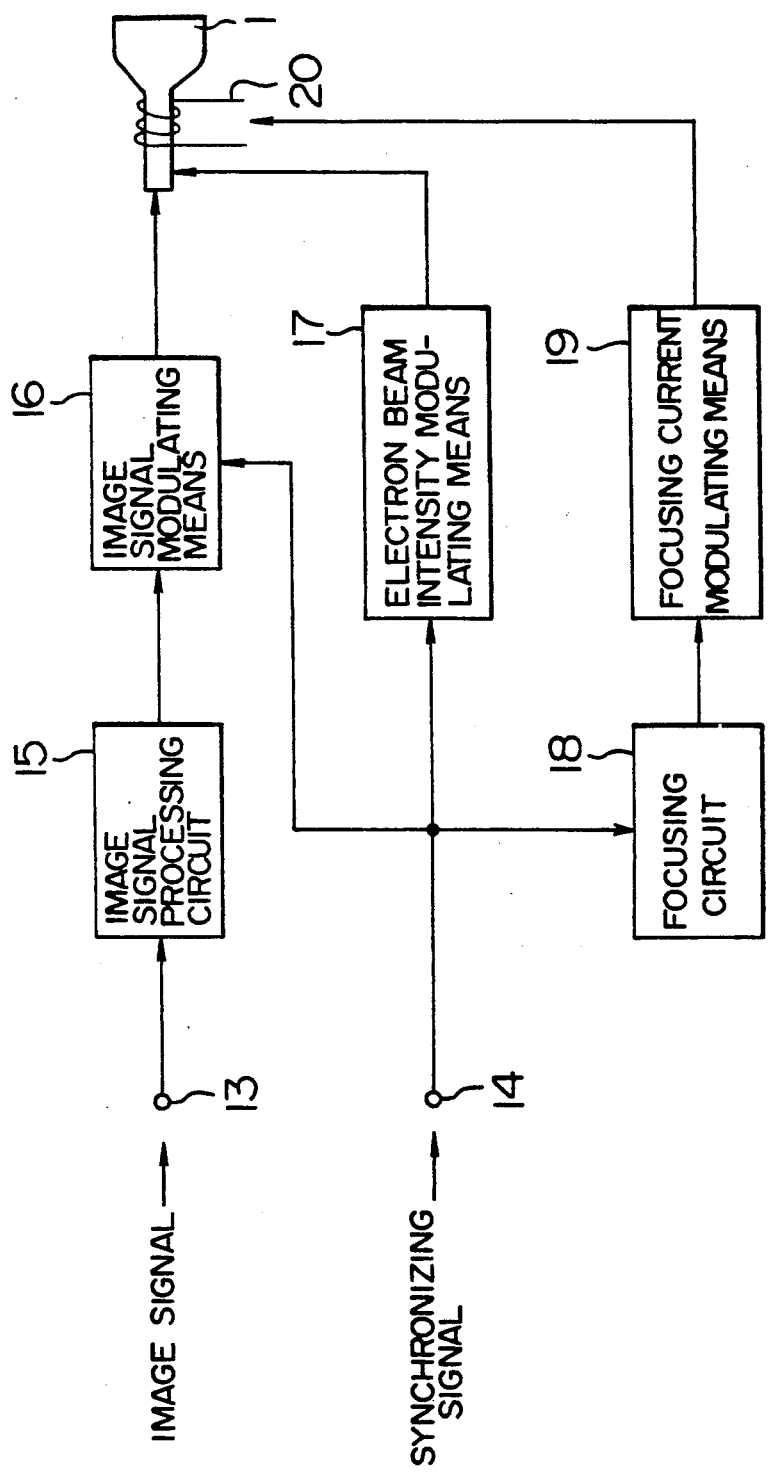
FIG. 19 is a block diagram of a electric circuit, which is a third embodiment of the present invention.

FIG. 19 is a block diagram showing a third embodiment of the present invention using an electric circuit, in which reference numeral 1 is a projection type cathode-ray tube; 13 is an image signal input terminal; 14 is a synchronizing signal input terminal; 15 is an image signal processing circuit consisting of a noise suppressing circuit, a black level correcting circuit, a contour correcting circuit, etc.; 16 is image signal modulating means; 17 is electron beam intensity modulating means for the projection type cathode-ray tube 1; 18 is a focusing circuit for the projection type cathode-ray tube 1; 19 is focusing current modulating means; and 20 is a focusing coil for the projection type cathode-ray tube 1.

In FIG. 19, an image signal inputted in the image signal input terminal 13 is applied to the cathode of the projection type cathode-ray tube 1 through the image signal processing circuit 15 and the image signal modulating circuit 16. Here the image signal modulating means 16 generates a correcting function having a polarity, which is reverse to that of the fluctuations in the color, using a synchronizing signal inputted in the synchronizing signal input terminal 14, in order to remove the fluctuations in the color generated on the screen (not shown in the figure) of the projection type image display device, and has a function of multiplying the image signal by this correcting function.

On the other hand, the synchronizing signal described above is applied to the grid of the projection type cathode-ray tube 1 through the electron beam intensity modulating means 17. Here the electron beam intensity modulating means 17 is means for modulating input electric power to the image source, which generates a correcting function having a polarity, which is reverse to that of the fluctuations in the color on the screen, using the synchronizing signal, just as the image signal modulating means 16. This correcting function signal is superposed on the potential difference between the cathode and the grid to modulate the electron beam intensity of the projection type cathode-ray tube 1.

Further the synchronizing signal described above is applied to the focusing coil 20 of the projection type cathode-ray tube 1 through the focusing circuit 18 and the focusing current modulating means 19. Here the focusing current modulating means 19 is means for modulating output characteristics of the emitted light for the input electric power to the image source, which generates a correcting function having a polarity, which is reverse to that of the fluctuations in the color on the screen, using the synchronizing signal, just as the image signal modulating means 16 and the electron beam intensity modulating means 17 and has a function of multiplying the focusing signal of the output of the focusing circuit 18 by this correcting function.

In the present embodiment each of these correcting functions may be determined so as to remove the fluctuations in the color on the screen in the whole by using the image signal modulating means 16, the electron beam intensity modulating means 17 and the focusing current modulating means 19.

Furthermore the image signal modulating means 16, the electron beam intensity modulating means 17 and the focusing current modulating means 19 are not always used all together, but the device may be constructed by using one or two of them. In addition, the device may be constructed by some of these three means together with the optical system using the clapper plates as indicated in the first and the second embodiment. In any case, it is possible to make the color temperature higher at the peripheral portion of the screen than at the central portion of the screen, when a white image is displayed on the whole surface of the screen, while selecting appropriate correcting functions and shapes of the clapper plates.

In the embodiment using the electric circuit described above, since the correcting functions are complicated, it is unavoidable to raise the fabrication cost. However, contrarily to the fact that in the first and the second embodiment of the present invention using the clapper plates the illuminance at each point on the incident surface of the screen is never increased with respect to the case where the clapper plates are removed, in the embodiment using the electric circuit described above, an effect can be obtained that the fluctuations in the color is reduced also by increasing the illuminance at a part of points on the incident surface of the screen.

As it is clear from the above explanation, according to the present invention, even in the case where the projection distance between the projecting lenses and the screen is as small as e.g. about 700 to 800 mm and the (convergence) angle offset of the optical axes of the projecting lenses is as great as e.g. about 7° to 10°, the fluctuations in color on the surface of the screen can be reduced and an effect can be obtained that an image of very high quality is realized. At this time, in particular when a white image is displayed on the whole surface of the screen, in the case where the color temperature is higher at the peripheral portion of the screen than at the central portion of the screen, since it is possible to reproduce the colors similar to the color television by means of a color cathode-ray tube, an effect can be obtained that usual observers feel the image having an extremely high quality.

Furthermore, in this way, not only in a projection type television for home use but also in particular in a rear projection type image display device, it is possible to reduce the size of the casing, in which the projecting optical system is located, without increasing the fluctuations in the color on the screen and thus an effect of reducing the setting space of the image display device can be obtained.

What is claimed is:

1. An optical system for a projection type image display device comprising:
   image sources for red, green and blue;
   a screen, on which an image is projected;
   a projecting lens disposed in front of each of said image sources for the different colors and projecting the image displayed on each of said image sources on said screen, while enlarging it; and
   a clapper plate disposed in the path of the light beam projected from at least one of said image sources for the different colors through said projecting lens on said screen and having a clapper shape, which is not axially symmetric with respect to the optical axis of said projecting lens.

2. An optical system for a projection type image display device according to claim 1, wherein the clapper plates have different shapes for the different colors with reference to the up and down direction and the left and right direction of the imaging face of each of said image sources.

3. An optical system for a projection type image display device according to claim 1, wherein said image sources are disposed parallelly to the horizontal direction in the surface of said screen in an order of red, green and blue, the image source for green being disposed at the center and said clapper plates for projecting the red and the blue light beam have shapes, which are symmetric to each other, with reference to the up and down direction and the left and right direction of the imaging face of each of said image sources.

4. An optical system for a projection type image display device according to claim 2, wherein said image sources are disposed parallelly to the horizontal direction in the surface of said screen in an order of red, green and blue, the image source for green being disposed at the center and said clapper plates for projecting the red and the blue light beam have shapes, which are symmetric to each other, with reference to the up and down direction and the left and right direction of the imaging face of each of said image sources.

5. An optical system for a projection type image display device according to claim 1, wherein said clapper plates have clapper shapes, in which the clapper radius measured from the optical axis of the relevant projecting lens is relatively small in a specified direction so that, when a white image is displayed on the whole surface of said screen, the ratio of the illuminance of the different colors, red, green and blue, on the incident surface of the screen in the neighborhood of the left and right ends of the screen or in the neighborhood of the four upper and lower corners is approximately equal to that at the central portion of the screen.

6. An optical system for a projection type image display device according to claim 2, wherein said clapper plates have clapper shapes, in which the clapper radius measured from the optical axis of the relevant projecting lens is relatively small in a specified direction so that, when a white image is displayed on the whole surface of said screen, the ratio of the illuminance of the different colors, red, green and blue, on the incident surface of the screen in the neighborhood of the left and right ends of the screen or in the neighborhood of the four upper and lower corners is approximately equal to that at the central portion of the screen.

7. An optical system for a projection type image display device according to claim 3, wherein said clapper plates have clapper shapes, in which the clapper radius measured from the optical axis of the relevant projecting lens is relatively small in a specified direction so that, when a white image is displayed on the whole surface of said screen, the ratio of the illuminance of the different colors, red, green and blue, on the incident surface of the screen in the neighborhood of the left and right ends of the screen or in the neighborhood of the four upper and lower corners is approximately equal to that at the central portion of the screen.

8. An optical system for a projection type image display device according to claim 4, wherein said clapper plates have clapper shapes, in which the clapper radius measured from the optical axis of the relevant projecting lens is relatively small in a specified direction so that, when a white image is displayed on the whole surface of said screen, the ratio of the illuminance of the different colors, red, green and blue, on the incident surface of the screen in the neighborhood of the left and right ends of the screen or in the neighborhood of the four upper and lower corners is approximately equal to that at the central portion of the screen.

9. An optical system for a projection type image display device comprising:
   image sources for red, green and blue;
   a screen, on which an image is projected;
   a projecting lens disposed in front of each of said image sources for the different colors and projecting the image displayed on each of said image sources on said screen, while enlarging it; and
   a clapper plate disposed in the path of the light beam projected from at least one of said image sources for the different colors through said projecting lens on said screen and having a clapper shape, which is not axially symmetric with respect to the optical axis of said projecting lens, which clapper plate modulates the distribution of the illuminance of at least one of the colors of the light beams projected from said image sources for the different colors through said projecting lens on said screen.

10. An optical system for a projection type image display device according to claim 9, wherein the clapper plates have different shapes for the different colors with reference to the up and down direction and the left and right direction of the imaging face of each of said image sources.

11. An optical system for a projection type image display device according to claim 9, wherein said image sources are disposed parallelly to the horizontal direction in the surface of said screen in an order of red, green and blue, the image source for green being disposed at the center and said clapper plates for projecting the red and the blue light beam have shapes, which are symmetric to each other, with reference to the up and down direction and the left and right direction of the imaging face of each of said image sources.

12. An optical system for a projection type image display device according to claim 10, wherein said image sources are disposed parallelly to the horizontal direction in the surface of said screen in an order of red, green and blue, the image source for green being disposed at the center and said clapper plates for projecting the red and the blue light beam have shapes, which are symmetric to each other, with reference to the up and down direction and the left and right direction of the imaging face of each of said image sources.

13. An optical system for a projection type image display device according to claim 9, wherein said clapper plates have clapper shapes, in which the clapper radius measured from the optical axis of the relevant projecting lens is relatively small in a specified direction so that, when a white image is displayed on the whole surface of said screen, the ratio of the illuminance of the different colors, red, green and blue, on the incident surface of the screen in the neighborhood of the left and right ends of the screen or in the neighborhood of the four upper and lower corners is approximately equal to that at the central portion of the screen.

14. An optical system for a projection type image display device according to claim 10, wherein said clapper plates have clapper shapes, in which the clapper radius measured from the optical axis of the relevant projecting lens is relatively small in a specified direction so that, when a white image is displayed on the whole surface of said screen, the ratio of the illuminance of the different colors, red, green and blue, on the incident surface of the screen in the neighborhood of the left and right ends of the screen or in the neighborhood of the four upper and lower corners is approximately equal to that at the central portion of the screen.

15. An optical system for a projection type image display device according to claim 11, wherein said clapper plates have clapper shapes, in which the clapper radius measured from the optical axis of the relevant projecting lens is relatively small in a specified direction so that, when a white image is displayed on the whole surface of said screen, the ratio of the illuminance of the different colors, red, green and blue, on the incident surface of the screen in the neighborhood of the left and right ends of the screen or in the neighborhood of the four upper and lower corners is approximately equal to that at the central portion of the screen.

16. An optical system for a projection type image display device according to claim 12, wherein said clapper plates have clapper shapes, in which the clapper radius measured from the optical axis of the relevant projecting lens is relatively small in a specified direction so that, when a white image is displayed on the whole surface of said screen, the ratio of the illuminance of the different colors, red, green and blue, on the incident surface of the screen in the neighborhood of the left and right ends of the screen or in the neighborhood of the four upper and lower corners is approximately equal to that at the central portion of the screen.

17. An optical system for a projection type image display device according to any one of claims 1 to 16, wherein said clapper plates have clapper shapes, in which the clapper radius measured from the optical axis of the relevant projecting lens is relatively small in a specified direction so that, when a white image is displayed on the whole surface of said screen, the color temperature in a region, which is greater than a half of the peripheral portion, excluding the central portion of said screen, is higher than the color temperature in the neighborhood of the center of said screen.

18. A projection type image display device comprising the optical system according to any one of claims 1-16, and means for enabling image display.

19. A projecting lens for a projection type image display device, comprising:
   a plurality of lenses;
   a lens body tube holding and fixing said lenses; and
   a clapper plate having a clapper shape, which is not axially symmetric with respect to the optical axis of the projecting lens, and mounted in said lens body tube.

20. A projecting lens for a projection type image display device according to claim 19, wherein said clapper plates have clapper shapes, in which the clapper radius measured from the optical axis of the relevant projecting lens is relatively small in a specified direction so that, when a monochromatic image at a uniform gradation level is displayed on the whole surface of the screen, the distribution of the illuminance on the incident surface of the screen is nearly axially symmetric around the center of the screen, depending on the relative position of said projecting lens and said screen.

21. A projection type image display device comprising a screen, and means for enabling control of color temperature of said screen so that when a white image is displayed on the whole surface of said screen, the color temperature in a region, which is greater than a half of the peripheral portion, excluding the central portion of said screen, is higher than the color temperature in the neighborhood of the center of said screen.

22. A projection type image display device comprising the optical system according to claim 17, and means for enabling image display.

23. A projection type image display device comprising the optical system according to any one of claims 1-8, and more than one of image signal modulating means, means for modulating input electric power to said image sources, and means for modulating light emitting output characteristics for the input electric power to said image sources so that when a white image is displayed on the whole surface of said screen, the color temperature in a region, which is greater than a half of the peripheral portion, excluding the central portion of said screen, is higher than the color temperature in the neighborhood of the center of said screen.

24. A projection type image display device comprising:
   image sources for red, green and blue;
   a projecting lens disposed in front of each of said image sources for the different colors and projecting the image displayed on each of said image sources on said screen, while enlarging it;
   a screen, on which an image is projected, the optical axes of said projecting lenses intersecting each other at one point away from the surface on the side opposite to said image sources; and
   a clapper plate disposed within said projecting lens in front of each of the red and the blue image source, whose clapper shape is not symmetric in the horizontal and/or vertical direction with respect to the respective optical axis.

25. A projection type image display device according to claim 24, wherein said image sources are arranged in the horizontal direction in an order of red, green and blue; the clapper plate for red is so formed that the clapper radius is small aside to the green image source in the horizontal direction and on the other hand the clapper plate for blue is so formed that the clapper radius is small aside to the green image source in the horizontal direction.

26. A projection type image display device according to claim 24, wherein said image sources are arranged in the horizontal direction in an order of red, green and blue; the clapper plate for red is so formed that the clapper radius is small aside to the green image source in the horizontal direction and at the same time it becomes smaller upward and downward with increasing distance from the green image source and on the other hand the clapper plate for blue is so formed that the clapper radius is small aside to the green image source in the horizontal direction and at the same time it becomes smaller upward and downward with increasing distance from the green image source.

27. A projection type image display device according to claim 24, wherein said image sources are arranged in the horizontal direction in an order of red, green and blue; the clapper plate for red is so formed that the clapper radius becomes smaller upward and downward with increasing distance from the green image source and on the other hand the clapper plate for blue is so formed that the clapper radius becomes smaller upward and downward with increasing distance from the green image source.

28. A projection type image display device, wherein by using more than one of image signal modulating means, means for modulating input electric power to said image sources, and means for modulating light emitting output characteristics for the input electric power to said image sources, when a white image is displayed on the whole surface of said screen, the color temperature in a region, which is greater than a half of the peripheral portion, excluding the central portion of said screen, is higher than the color temperature in the neighborhood of the center of said screen.

* * * * *